United States Patent Office 3,403,109
Patented Sept. 24, 1968

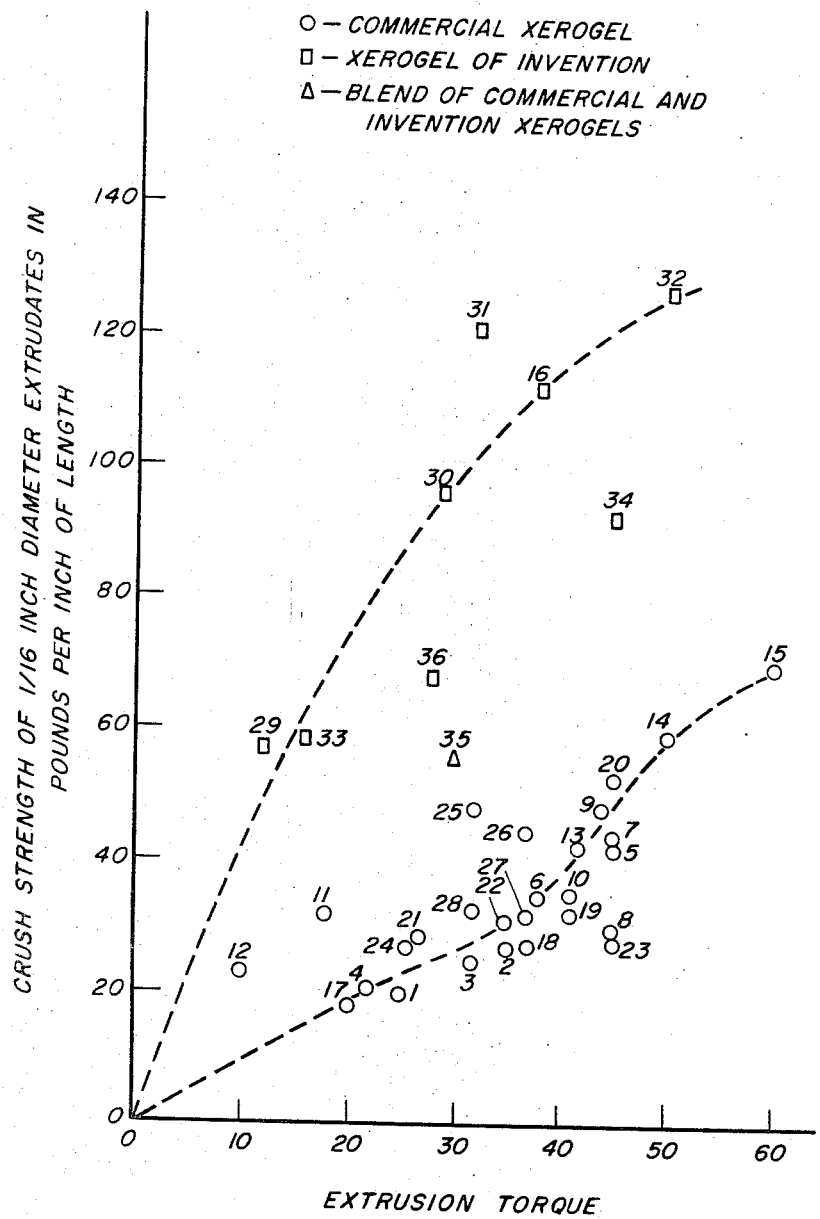

3,403,109
SILICA-ALUMINA CATALYST SUPPORT
Joseph Dennis Colgan, Ozone Park, N.Y., and William Eugene Sanborn, Wilton, Conn., assignors to American Cyanamid Company, Stamford, Conn., a corporation of Maine
Continuation-in-part of application Ser. No. 482,165, Aug. 24, 1965. This application Oct. 15, 1965, Ser. No. 496,633
20 Claims. (Cl. 252—451)

ABSTRACT OF THE DISCLOSURE

A process for preparing a silica-containing gel characterized in that a xerogel derived therefrom has a pore volume of from about 1.3 to about 2.0 cc./g. when measured after calcining said xerogel, said process comprising: (1) reacting (a) an alkali metal silicate with (b) mineral acid, (c) in a water heel of a pH of between about pH 1.0 and pH 4.5, said silicate and said acid being added in an amount sufficiently to raise pH to at least about pH 9, and sufficiently to form a gel reaction product, (2) adding to said reaction product a mineral acid in an amount sufficient to lower the pH within a range of at least about pH 7.75 and about pH 8.75, and (3) thereafter aging said reaction product for a period of at least about 15 minutes, at a temperature of at least about 100° F.

---

This is a continuation-in-part to U.S. application Ser. No. 482,165, filed Aug. 24, 1965, and now abandoned.

This invention relates to silica-containing and silica-alumina extrudate catalyst supports having improved high crush strength and processes for preparation of same. More particularly, the invention relates to the feed hydrogel, or alternatively the feed xerogel, from which the extrudate is formed, and to the processes of preparing a hydrogel, or alternatively a xerogel, suitable for use as a feed material which when extruded produces the high crush strength extrudates of this invention.

In preparing extruded catalyst, different problems are encountered than are encountered in the preparation of bead catalysts. Generally speaking, in the preparation of extruded catalysts, the difficulties which are encountered on the small scale are magnified and intensified when attempts are made to produce them on a larger commercial scale. This is particularly true if the catalyst produced (1) is to be uniform and consistently prepared having a high degree of activity as calculated on a weight and volume basis as these terms are understood in the art, and (2) is to have a good (high) crush strength, a necessary prerequisite for fixed bed catalysts.

Thus, for example, if the ratio of base and activating materials, the proper use of lubricants, plasticizers and other variables, are not controlled within relatively narrow limits as to amounts, time of addition, other conditions of addition, and the like, the extrudates will have a poor (low) crush strength and will have a ready tendency to crumble, or the extrudates may alternatively be gummy and difficult to extrude. Further, if the extrusion mix is not of proper composition and content, it has been found in many instances that the formation of the extrudate is extremely difficult if not impossible in that the extrusion mix tends to ride on the extruder auger rather than being extruded. If the plasticity or the consistency of the catalyst mass for extrusion is insufficiently fluid, it may be impossible to produce extruded pellets, in view of the fact that the extruder is unable to move the material through the die head. Catalyst mixtures having water contents in excess of those suited for the provision of extrudable mass are usually too free-flowing or too fluid to be properly extruded; in addition, this physical condition increases the difficulty of other processing problems, as for example, the drying of the extruded catalyst mixture. In some instances, this physical condition adversely affects the activity of the final catalytic product, as well as detrimentally affecting the crush strength. If the catalyst mixture is too plastic, after extrusion, extruded pellets have a strong tendency to adhere to one another, which characteristic may (a) destroy the saleability of a given production run, as well as (b) detrimentally affect the crush strength of the final extruded catalyst product.

While it would seem that many of these difficulties could be readily overcome simply by adding more or less dry material, or more or less moisture to any given extrusion mix, practical information dictates to the contrary, either (1) because the extrusion mix after such modification simply is incapable of forming a good extrudate or (2) because such seemingly minor variations in a given procedure result in a mix which, while it can be extruded and produces an extrudate having a good appearance, has undesirably and possible unacceptably low crush strength.

While the need for a satisfactory extrusion process for this type extrudate catalyst has been recognized by the prior art, no fully satisfactory process has previously been proposed for the extrusion of silica and silica-alumina catalyst supports with a high degree of crush strength associated with the extrudate. These silica compositions typically are very hard and abrasive when dried and have proved to be extremely difficult to extrude. While there has been some success with extrusion of soft, newly formed silica and silica-alumina hydrogels containing a high water content, no fully satisfactory procedure has previously been proposed for extrusion of older, previously dried or powdered silica and silica-alumina feed materials.

It is an object of this invention to obtain an extrudate catalyst having a high degree of crush strength.

Another object is to obtain an extrudate catalyst support having a high degree of crush strength.

Another object is to obtain an extrusion feed having optimal properties for extrusion through a die.

Another object is to provide a method of extruding a catalyst support, or a catalyst, having a high degree of crush strength.

Other objects are to provide methods of preparing hydrogels, and the xerogels derived therefrom, which are characterized (1) by a high pore volume of calcined xerogels derived therefrom, and (2) by extrudates formed therefrom having a high crush strength.

Another object is to obtain silica hydrogels, silica-alumina hydrogels, and xerogels derived therefrom which are characterized (1) by a high pore volume of calcined xerogels derived therefrom, and (2) by extrudates formed therefrom having a high crush strength.

Other objects of this invention become apparent in the light of the above and following disclosure, and the accompanying single figure is a graphic representation of the inventions as illustrated by Example III as in contrast to prior art Example II.

The applicants have discovered that an extrudate having an unexpectedly high degree of crush strength may be prepared by extruding an extrusion feed which includes as a principal component, a partially dried hydrogel and/or a xerogel prepared by novel processes. Applicants have further discovered that the novel extrudate having a high degree of crush strength may be prepared from a feed which includes as a principal component a partially dried hydrogel and/or xerogel which are characterized by the fact that calcined xerogels derived from the hydrogel or the xerogel have a high pore volume.

Xerogel is a term typically used to describe the solid formed when a hydrogel is dried at approximately 250° F. A spray dried solid in the form of microspheres. Drying hydrogel at 250° F. removes essentially all of the free water and produces a material which is approximately 87% solids, 13% bound water.

Pore volume is determined by titrating the sample (usually calcined xerogel or calcined extrudates) with water at ambient temperature to saturation. Pore volume is then reported as cc. (of water) per gram (of sample). It is a measure of the particle density of the sample. Note: See Cyanamid Manual, "Test Methods for Synthetic Fluid Cracking Catalysts," p. 21.

Macroporosity and microporosity are described as follows. Pores in high surface area materials such as activated silica gels are frequently divided into two or more distinct classes with respect to size. The smaller, the micropore system, contributes substantially all the surface area and is generated by activation. The larger capillaries, the macropores, are dependent on the method of manufacture, the type of agglomeration or degree of grinding for instance. Macropores contribute very little to surface area.

Micropores are arbitrarily broadly defined as pores whose diameters are less than 650 anstroms. These are pores within the range where capillary condensation of nitrogen occurs. Volume of pores in this range can therefore be measured by nitrogen absorption at high relative pressure.

Macropores are arbitrarily broadly defined as pores with diameters greater than 650 angstroms. The volume of macropores is generally calculated as the difference between the total pore volume and the volume of the micropores. Total pore volume may be measured by water titration to saturation. Particle density may also be measured (by mercury displacement, or, with extrudates, by measuring particle weights and dimensions), and used with known values of skeletal density to calculate pore volume. Macropore volume and pore size distribution in the macropore range (similar to the pore size distribution in the micropore range which can be obtained with nitrogen) can also be obtained by mercury penetration.

Bulk density is the weight per unit volume of bulk sample under prescribed conditions. Apparent bulk density (ABD) is the weight of sample which occupies a unit of volume when the unit of volume is rapidly filled by sample flowing by gravity from a low elevation (several inches). Compacted bulk density (CBD) is the weight of sample which will occupy a unit of volume when the sample is vibrated in a container to minimize container voids and maximize the weight of sample. Note: See Cyanamid Manual "Test Methods for Synthetic Fluid Cracking Catalyst," p. 9.

Extrudate crush strength is determined by selecting a sample of extrudates with length equal to from about 1.5 to about 3.0 times the extrudate diameter. The length of each extrudate is measured, and an average length is calculated. Each extrudate is then, in turn, placed between two flat plates and the force required to crush the extrudate is measured. The average crushing force for the sample is then calculated. Division of the average crushing force in pounds by the average extrudate length in inches yields a measure of extrudate crush strength which is termed "CSL." Units are pounds (of force) per inch (of length).

Extrusion torque referred to in the examples is the torque required to rotate the extruder auger at about 50 r.p.m. There are no units to the torque values given; they are only relative measures. For a given extruder feed mix composition, extrusion torque can be expected to increase as the solids (or non-volatile) content of the feed increases.

Prior to applicants' discovery, a high degree of crush strength of catalyst support or of a catalyst formed therefrom, was normally thought by the skilled artisan to be associated with a high apparent bulk density, and low pore volume. Low apparent bulk density and high porosity previously were normally associated with a support or catalyst derived therefrom which could be easily crumbled such as by merely applying pressure between the fingers, whereby the catalyst or catalyst support would become finely divided, pulverized material. Applicants have discovered that xerogels or hydrogels when reduced to xerogels, characterized by low apparent bulk density and by high porosity impart unexpectedly a high order of crush strength to extrudates formed therefrom.

Hydrogels from which xerogels derive are normally prepared by a method known as a strike. Typically, in carrying out the conventional strike method, (1) an alkali metal silicate such as sodium silicate solution is reacted with a mineral acid such as sulfuric acid, hydrochloric acid, nitric acid, and the like, after which (2) the sol is gelled by appropriate means such as pH adjustment, (3) the final density of the gel is regulated by allowing the hydrogel to age, (4) the alkali ions are removed by base exchange with cations such as ammonium, and (5) the product is washed and dried.

According to the present invention, three distinct methods have been found to obtain a hydrogel or a xerogel derived therefrom, which when employed as an extrusion feed obtains an extrudate having unexpectedly high crush strength, as well as desirable extrusion characteristics.

The first method is hereafter referred to as a "double-precipitation-strike." By this method, (1) approximately one-half of the total acid such as sulfuric acid and (2) alkali metal silicate such as sodium silicate, are added to a water heel while maintaining a pH of about 1.0 to about 4.5, the preferred pH being from about pH 2.5 to about pH 3.0. The silicate addition is then continued until there has been an increase in pH up to at least about pH 9, preferably about pH 10. The second half of the total acid is then added to bring the batch pH down to not lower than about pH 7.8 up to not more than about pH 8.7, preferably about pH 8.0 to about pH 8.5, and the gel is thereafter aged for at least about 15 minutes, preferably about 30 minutes, at a strike temperature of at least about 100° F., preferably from about 115° F. to 120° F., with batch solids between about 4% and 9% and preferably at about 6%. In the initial above reaction of one-half the acid with the alkali metal silicate, it is not critical that the pH be acid, although the optimum results are obtained at the pH of about pH 1.0 to about pH 4.5, preferably about 2.5 to about 3.0 as stated above. Any conventional operable pH is within the scope of this invention.

The second method is hereafter referred to as the "high salt-heel" strike. By this method, the standard strike procedure is employed (as discussed above and hereafter prior to this invention), except that instead of reacting an alkali metal silicate with a mineral acid in a water heel, by the high salt-heel process an aqueous solution of a salt (typically prepared by reaction of an alkali metal compound with a mineral acid) is employed as a heel in substitution for a water heel normally employed in the ordinary standard strike method. The moles of salt (such as $Na_2SO_4$) added in ratio to the moles of silica present in the final batch after the strike may range from a low ratio of about 1:72 to a high ratio of about 1:4.5, preferably 1:36 to 1:9, of salt:$SiO_2$. The salt concentration in the water heel before beginning the strike may range from about 0.33% to about 5.3%, preferably about 0.66% to about 2.65%, based on the weight of water employed.

Thereby, by the high salt-heel method of this invention, in intimate contact with a heel which includes the salt of an alkali metal in the concentration and ratio discussed above, alkali metal silicate is reacted with a mineral acid to form a reaction product. Additionally, however, by the high salt-heel method of this invention, it has been found necessary to employ an aging period of at least about 15 minutes at a temperature of at least about 100° F. at the standard pH of above about pH 6.5 up to about pH 8.0. Only in the extreme situation, where the maximum high salt concentration and the high ratio are employed, could a temperature possibly as low as about 80° F. be employed for purposes of this second method. The sodium silicate normally employed is about 28¼% (±¼%) $SiO_2$, and although the acid concentration is not normally critical, the sulfuric acid employed is normally about 25% (±½%), on a weight basis. The silicate glass (solid) or water-glass (solution) preferably has a high $SiO_2:Na_2O$ molar ratio, normally about 3.25 $SiO_2:Na_2O$ molar ratio. Low $SiO_2$ content lowers yield, increases the required amount of acid reactant, and thus increases cost.

By the third process of this invention, hereafter referred to as the high-temperature process, either a conventional procedure or the above procedures may be followed for the strike method, except that (1) after the alkali metal silicate is added to a water heel thereby raising the pH typically to at least about 8.0 to about pH 11—as dependent upon the solids content, mineral acid is added in an amount sufficient to lower or adjust the pH to form at least about pH 7 to about pH 8.5, and (2) thereafter the reaction-product gel is aged for a period of at least 15 minutes at a temperature of at least about 135° F. After the aging, in accordance with conventional strike methods, the pH is lowered to normally about pH 2.5 to about pH 4, preferably to about pH 3.0 to pH 3.5. The solids content of the aged product is preferably at about 7% by weight, but as stated above may vary. As noted above, if the alkali metal silicate is added in an amount to obtain a pH of at least pH 8.0, the pH need not necessarily be "lowered" but may be merely "adjusted" to the desired pH in the above stated range of about pH 7.0 to about pH 8.5. If pH is already within this range, obviously further lowering or adjustment is purely optional.

By each of the three methods discussed above, after the aging of the gel, the gel may be coated with alumina by any conventional procedure, such as by reacting alum and sodium aluminate, as is known to those skilled in the art. Also, it should be noted that any two or more of the above processes may be combined to produce a fourth method.

Additionally, it has been found that when employing any of the above three processes, an additional unexpected increase in the crush strength is obtained when the aged reaction product is filtered and washed to remove the alkali ions such as sodium sulfate prior to forming the spray-dried xerogel base.

It was also discovered that the extrudates having increased crush strength, extruded from a feed employing the gel reaction product of any one of the above three methods, have a low apparent bulk density and a high porosity when measured after calcining. It was found that an extrusion feed which obtains an extrudate having the unexpectedly high crush strength of this invention is characterized in that a xerogel which prior to extrusion is calcined and measured for pore volume, exhibits a pore volume from about 1.3 to about 2.0 cubic centimeters per gram, preferably about 1.5 to about 2.0 cc. per gram. Therefore, applicants have discovered that by employment of any one of the methods of this invention, any hydrogel or any xerogel which is characterized in that the xerogels derived therefrom have low apparent bulk density and high porosity within the range discussed above, as measured by calcining the xerogel prior to measuring the pore volume, imparts an unexpectedly high order of crush strength to an extrudate derived by the extrusion of an extrusion feed which includes a major proportion of that (1) partially dried hydrogel, or (2) xerogel, or (3) mixtures of hydrogel and xerogel.

The extrusion feed xerogels, which may optionally be milled, are mulled either with water or with undried or partially dried hydrogel slurry to produce a feed paste satisfactory for extrusion in conventional equipment. In the mixing operation, the pH is normally adjusted preferably with ammonium hydroxide to a pH greater than about 8.5 to obtain an extrudate having the high crush strength.

The water or slurry to xerogel ratio employed in the extrusion mix will vary depending on the pore volume of the xerogel and the desired final extrudate density and crush strength. Water or hydrogel added to the extrusion mix serves as a lubricant and thus facilitates extrusion. Typically sufficient water must be added to saturate the pores of the xerogel and to lubricate the mix. Higher pore volume xerogels therefore require more water and the moisture content of the extrusion mix is greater. When too much lubricating water (water over and above that required for pore saturation) is used, extrudate crush strength suffers. With low pore volume xerogels, i.e., 0.2 to 1.0 cc./g., considerable excess water is required to obtain satisfactory extrusion and crush strength is therefore low. When it is desired to increase density and/or crush strength, the amount of water or hydrogel in the extrusion feed mix must be reduced. This can be done in the case of high pore volume xerogels since extended mulling will readily compact, de-air, and fracture the more friable high pore volume particles, thereby releasing moisture from within the pores of the xerogel particles. This water then serves as the needed extrusion lubricant. Water required for extrusion of a high pore volume xerogel can readily be estimated. For a xerogel with a moisture content of 13.0% and a pore volume (as-is, i.e., before calcining) of 1.5 cc./g., water required would be slightly in excess of 1.5 cc./g. for a short mix or mull time. This corresponds to an extrusion mix moisture content of 65%. Extended mulling compacts the mix, thus permitting extrusion at lower moisture content and producing extrudates of higher density and crush strength. It might be expected that if a given xerogel could be extruded with just sufficient water added to saturate the pores of the xerogel that an extrudate with little macroporosity and therefore high crush strength could be produced. In the Table I, the extrusion mix solids level, which is produced by the addition of water just sufficient to saturate the xerogel pore volume, has been listed for xerogels of several pore volume levels. Also listed are the extrusion mix solids levels which have been found by experiment to be susceptible to extrusion. It can readily be seen that as xerogel pore volume decreases, it becomes necessary to add more and more water, over and above that required for saturation of the xerogel pores, to obtain extrusion. As a result, it becomes more difficult to produce extrudates with low macroporosity and high strength from low pore volume xerogel. See Table I below.

TABLE I

| Xerogel "as-is" PV[1] (cc./g.) | Pore saturation solids (percent) | Experimental extrusion solids range (percent) |
|---|---|---|
| 0.35 | 64.3 | 49–41 |
| 0.50 | 58.0 | 43–46 |
| 0.90 | 45.8 | 38–42 |
| 1.20 | 39.6 | 36–42 |
| 1.50 | 34.8 | 34–41 |

[1] Before calcination, and pore volume (PV) therefore refers to the xerogel which is 87% solids, 13% bound water.

It can also be seen that as the xerogel pore volume increases, the solids range in which extrusion can be effected also increases. This shows that it is possible with high pore volume xerogels of this invention to vary the extrusion mix solids level and thereby to vary the resulting extrudate density and crush strength.

Extrudates of high crush strength are produced at a low density by elimination of inter-particle voids (macroporosity). It is with the high pore volume xerogels that inter-particle voids are most readily eliminated. With low pore volume xerogels high density is obtained, but strength may be low because of the presence of interparticle voids, or an excessive amount of macroporosity. In other words, the presence of macroporosity in the xerogel facilitates the elimination of macroporosity in the formed particle (extrudate or pellet). Macroporosity in the xerogel increases the friability of the extrusion feed xerogel. Increased friability makes it easier to obtain close packing of the xerogel particle (and particle fragments obtained during forming) in the formed particle. Close packing of particles in the formed particle contributes to the crush strength of the formed particle, because improved bonding between particles results as the distance between particles is decreased and because interparticle, large void spaces (macroporosity) are eliminated. Inter-particle voids may be viewed as flaws in the formed particle which produce a weak point in the structure of the formed particle and results in low crush strength.

The role of macroporosity in extrudate crush strength is illustrated by measurements made on two extrudate samples. Data for these are listed below in Table II.

TABLE II.—PROPERTIES OF 1,100° F. CALCINED ⅛" DIAMETER EXTRUDATE

| Type xerogel used | Total (water-titration) PV (cc./g.) | Nitrogen sorption PV (cc./g.) | Marco PV (cc./g.) | Crush strength (CS/L) (lbs./in.) |
|---|---|---|---|---|
| Example I-3 [1] | 1.065 | 0.99 | .075 | 110 |
| Commercial | 0.84 | 0.63 | .21 | 48 |

[1] Example I-3 is fully described below.

In the above example, macropore volume is defined and calculated as the difference between water titration pore volume and nitrogen sorption pore volume. The data show that xerogel of the invention, which has macroporosity, produces an extrudate with low macroporosity and therefore high crush strength. The extrudate typically produced from commercial xerogel has lower total porosity, but has high macroporosity and the crush strength thereof is therefore low.

The extrudates of this invention are normally dried and calcined, preferably at a temperature of approximately 1400° F. It has been further found that by employing a high temperature of calcination, an additional moderate increase in strength is obtained without a decrease in surface area. However, it is possible to obtain a high degree of crush strength without high temperature calcination. Calcination may be normally carried out at temperatures of about 1050° F. or more.

In addition to the use of the hydrogels and xerogels, obtained by the process of this invention, to produce extrudates having increased crush strength, it has been found that the xerogels also unexpectedly impart a high order of crush strength when formed into tablets by conventional tabletting operations.

In the methods discussed above, the xerogels are normally but not necessarily obtained from the hydrogel by spray drying, to produce a powder which is typically about 87% solids, and 13% water. Although not limited thereto, the process and apparatus of the invention are particularly well adapted for the spray drying of slurries containing gelatinous silica, including silica-alumina, silica-magnesia and silica-alumina-magnesia compositions for use in the catalytic cracking of petroleum hydrocarbons. In the spray drying of silica slurries for the production of microspheroidal cracking catalysts, a two-phase slurry consisting of water containing small globules of hydrated silica, silica-alumina, silica-magnesia and the like is dispersed into a current of hot gases in a spray drying chamber. Usually the slurry is dispersed by discharging it onto a rapidly rotating vaned spray wheel mounted in the top of the drying chamber. A current of hot gases, such as hot products of combustion, is admitted tangentially at the periphery of the chamber and forms a rotating vortex into which the spray of silica slurry is projected by centrifugal force. In a process of this type, the evaporation of the water or other liquid component of the slurry takes place solely by the sensible heat of the gases, so that these gases are rapidly cooled. The drying capacity of the apparatus is therefore limited by the amount of heat that can be introduced in the drying gases.

This invention has been found to be particularly effective when producing an alumina-silica catalyst base having an alumina to silica ratio of about 25:75. However, the effective range includes ratios from about 30:75 to about 0.100.

For extrusion, the high alumina, i.e., about 25:75 ratio of alumina to silica, normally is mixed with water or undried slurry up to about 8% or more by weight, solids, optionally containing other additives.

Extrudates are normally dried at from about 150° F. to about 350° F., but are preferably dried at about 250° F. prior to calcination.

The extrusion feed must contain solids and percentages from at least about 30% to about 50%.

The catalysts or catalyst supports which are produced by the extrusion process which constitutes this invention may be used as cracking catalysts for fixed or moving beds or as catalysts, per se, in other reactions wherein this composition affords appropriate activity and selectivity. More generally, however, these catalyst supports, as obtained by the process of this invention, are used in conjunction with certain metals or metal oxides as promoters to form finished particulate catalysts for effecting reactions such as isomerization, hydrogenation, hydrocracking, and reforming of petroleum hydrocarbons. Promoters which may be added to these catalyst supports include one or more metals or oxides thereof selected from group I-B, II, III, IV, V, VI, VII, and VIII of the Periodic Table, especially the metal oxides such as magnesia, rare earth oxides, xirconia, titania, beryllia, thoria, or combinations thereof. Promoters of other materials which may be present in the catalytic compositions include, for example, one or more metals and/or the oxides thereof of platinum, palladium, rhodium, nickel, cobalt, cerium, tungsten, uranium, lead, zinc, calcium, magnesium, barium, lithium, chromium, and molybdenum or other combinations in amounts ranging from about 0.05 to about 40% by weight based on the finished catalyst.

The amount of promoter added to make the final catalyst composition varies according to the intended end use of the catalyst, and upon the specific promoter added, and embraces a preferred range of about 0.05%, to about 10% based on weight of the final catalyst. Generally, the metal oxides are added in the higher concentration range while metals, and particularly metals of the platinum type, added in concentrations of one percent or less. Catalysts particularly effective for the isomerization of n-paraffins and having good physical characteristics, are those in which palladium, platinum, and rhodium are added in concentrations of about 0.05 to about 1.0 weight percent. These metal promoters are preferably added to the hydrogel at a point in the process prior to extrusion. Thus, the metal promoter may be added to the solutions from which silica and alumina are precipitated, and precipitated at this point; or, the metal promoter may be precipitated on the already-formed and purified silica-alumina hydrogel; or the metal promoter may be added as a solution of a soluble metal compound to the purified silica-alumina hydrogel, followed by drying the mass to the desired water level. As an example of any of several alternate methods, the metal may be added by impregnation of the already-extruded and calcined silica-alumina support.

It should be noted that by employing applicants' invention, that an extrudate of high crush strength may be obtained which is not necessarily dependent upon an increased apparent bulk density of the extrudate. This is in contrast to the extrudates obtainable by conventional extrustion feed materials of silica alumina base for catalysts formed therefrom.

The properties of low bulk density and high porosity of a xerogel, which by the process of this invention have been found to impart a high order of crush strength to extrudates and to tablets, are believed to arise from macroporosity. As described above, macroporosity, as contrasted to microporosity, refers to larger spaces between small particles which have been linked by reaction; it is believed that the high degree of crush strength imparted to extrudates and to tablets made from feed having this higher order of porosity, arises from the fragile, friable and disintegrateable nature of the xerogel. Thereby, when exposed to the crushing conditions of the conventional tabletting procedures and of extrusion, the macroporosity xerogel forms a compact tablet or extrudate, having a high degree of crush strength. Although the above theory is believed to be correct, the invention herein disclosed does not depend upon the correctness of the theory.

The invention will be further illustrated in greater detail by the following specific examples. It should be understood, however, that although these examples may be described in particular detail regarding some of the more specific features of the invention, they are given primarily for purposes of illustration and the invention in its broader aspects is not to be construed as limited thereto, except as limited in the appended claims.

All percentages are by weight unless otherwise specified.

The extruder employed in the examples is a conventional auger-type screw machine—a series 2,000, double worm extruder manufactured by Welding Engineers. Size of the machine is described by the auger (worm or screw) diameter which was 2 inches. The extruder was driven by a 7½ H.P. motor and was operated at an auger speed of 50 r.p.m.

EXAMPLE I-1

This Example I-1 illustrates a typical "prior art" strike process.

Hydrogel is prepared by simultaneous addition of acid and silicate to a 2% $Na_2SO_4$-water heel at pH 2.8–3.2, followed by the addition of caustic to bring down the pH to below about 6.5. The gel is aged at this pH for one hour, coated thereafter by a conventional alum-sodium aluminate procedure, filtered, washed, and spray-dried. Typical prior art strikes are disclosed in U.S. Patent No. 2,763,533.

EXAMPLE I-2

This Example I-2 illustrates the method number one of this invention, the "double precipitation" strike method, employing silica-alumina.

Nine thousand pounds of water at about 110° F. is added to a tank fitted with a turbine agitator. An acidic silica sol is then formed by adding about 950 pounds 25% sulfuric acid solution and 1575 pounds 41° Bé. silicate of soda solution, simultaneously over a period of 5 minutes, to the water heel, with agitation. The acid rate is controlled to keep the batch pH at 2.5–3. After forming the sol in this manner, an additional 1575 pounds of 41° Bé. sodium silicate is added, forming a gelatinous precipitate and raising the pH to 10. Acid is then added to reduce the pH to 8.0. The resulting slurry is aged for 30 minutes at 115° F. prior to coating with alumina by adding solutions of aluminum sulfate and sodium aluminate. After filtering and washing to remove salts, the slurry is spray dried.

EXAMPLE I-3

This Example I-3 illustrates the method number two of the invention, the "high salt heel" strike method, silica-alumina.

Nine thousand pounds of a dilute salt solution containing about 135 pounds of sodium sulfate is charged to a tank fitted with a turbine agitator. To this solution is added 3150 lbs. of commercial silicate of soda solution (41° Bé., 28½% $SiO_2$, 9% $Na_2O$). The resulting dilute solution is heated to 120° F. and then acidified by adding about 1800 lbs. of a solution of sulfuric acid (25% $H_2SO_4$), at a uniform rate over a period of 40 minutes. The resulting silica gel precipitate is found to have a pH of about 6.5 and a temperature of about 120° F. It is aged at these conditions for about 30 minutes. During the aging period, it is transferred to a larger tank along with a second strike batch, similarly prepared; the combined gel batches are then coated with alumina, using solutions of aluminum sulfate and sodium aluminate, to give a composition approximately 25% $Al_2O_3$, 75% $SiO_2$ on a dry, salt free basis.

The coated slurry is then filtered and washed on rotary vacuum filters in several stages to remove the dissolved salt. The final washed hydrogel slurry is spray dried. The resulting xerogel is tested by conventional procedures as described in Bulletin No. 6131, "Test Method for Synthetic Fluid Cracking Catalyst," American Cyanamid Company, 1959.

EXAMPLE I-4

This Example I-4 illustrates a combination of methods one and two of the invention, the "high salt heel"-double precipitation method, silica-alumina.

Nine thousand pounds of a dilute salt solution containing about 135 pounds of sodium sulfate is charged to a tank fitted with a turbine agitator. To this solution is added 2030 pounds of commercial silicate of soda solution (41° Bé., 28½% $SiO_2$, 9% $Na_2O$). The resulting dilute solution is then heated to about 135° F. and then acidified by adding a 25% solution of sulfuric acid over about a 15 minute period to bring the solution pH to about 2.5–3.0. An additional 2030 pounds of silicate is then added followed by additional 25% sulfuric acid solution added over a 15 minute period to bring the pH to about 8.0–8.5. Agitation is then stopped and the mix is aged for one hour at about 140° F. prior to coating with alumina by adding solutions of aluminum sulfate and sodium aluminate. After filtering and washing to remove salts, the slurry is spray dried.

EXAMPLE I-5

This Example I-5 illustrates the method number three of the invention, the high temperature strike method employing silica-alumina. One thousand seventy gallons of water are drawn in a tank fitted with a turbine agitator, and 3150 lbs. of 41° Baumé (Bé.)-sodium silicate solution are added. The temperature of the mixture is adjusted to 160° F. A 25% solution of sulfuric acid (about 1800 lbs.) is then added at a uniform rate over a period of 40 minutes, forming a gelatinous precipitate. The slurry temperature is found to be about 150° F., and its pH is about 8.0. The slurry is aged at these conditions for about 30 minutes. The silica is then coated with alumina, filtered, washed, and spray dried.

Table III illustrates Examples I-1, 2, 3, 4, and 5.

TBLE III

| ∨Example I, xerogels | 1,100° F. PV, cc./g. | Packed ABD g./cc. |
|---|---|---|
| No. I-1 (prior art) | 1.19 | 0.41 |
| No. I-2 (method 1) | 1.87 | 0.22 |
| No. I-3 (method 2) | 1.74 | 0.29 |
| No. I-4 (method 1 and 2 combined) | 1.60 | 0.23 |
| No. I-5 | 1.32 | 0.31 |

Table III illustrates that novel extrusion feed materials comprising silica-alumina methods 1, 2, and 3 which produce the extrudates of applicants' invention are characterized by calcined xerogels of the feed silica-alumina which have pore volumes after calcination of at least about 1.3 and characteristically low apparent bulk density.

EXAMPLE I-6

This Example I-6 further illustrates the silica gel high temperature strike method three of this invention.

Eleven hundred ninety gallons of water are drawn in a tank equipped with a turbine agitator, and 3150 lbs. of 41° Bé. sodium silicate is added. The temperature of the mixture is adjusted to 110° F. Sulfuric acid solution (25%) is then added at a uniform rate over a 15 minute period. Acid addition is stopped when the pH of the mixture has dropped to 8.0. The batch is allowed to age at 8.0–8.5 pH and 115° F. temperature for 30 minutes.

More acid is then added to lower the pH of the batch to 3.0–3.5. The batch is then diluted with 700 gallons of water (and flocculated with a small amount of bond glue solution) to control the subsequent filtration. The slurry is pumped to a rotary vacuum filter and washed with decationized water. The resulting filter cake, containing less than 1% $Na_2SO_4$ on a dry basis, is repulped and spray dried. (See Table IV, experiment-strike "2.")

Additional silica xerogel batches are prepared as described above, with variations only in the amount of heel water used and the initial and final temperatures, as outlined in Table IV.

Silica xerogels are also prepared by spray drying strike slurry after aging, but prior to diluting or filtration. The salt containing xerogel thus produced is repulped in water at 10% solids, and the resulting suspension is pumped to a rotary vacuum filter. The rewetted xerogel is filtered and washed using one or more filtration stages to reduce the salt content to less than one percent, D.B. See Table IV, strikes "1," "3," "4," and "5."

TABLE IV.—STRIKE CONDITIONS AND XEROGEL PROPERTIES

| Experiment No. | Strike | | Xerogel calcined at 1,100° F. | |
|---|---|---|---|---|
| | Heel water used, gallons | Final temp., ° F. | Pore volume | Surface area |
| 1 | 1,190 | 105–110 | .80–.90 | 705 |
| 2 | 1,190 | 110–115 | .90–1.0 | 690 |
| 3 | 1,190 | 120–130 | 1.0–1.1 | 645 |
| 4 | 1,000 | 130–140 | 1.1–1.3 | 600 |
| 5 | 1,190 | 140–150 | 1.3–1.5 | 600 |

Table IV illustrates that applicants' novel xerogel *having a high degree of porosity, at least about 1.3, is obtained by employing a temperature of at least about 135° F.*

EXAMPLE II

Prior art xerogels

In each of the following Examples II–1, 2, and 3, pre-extrusion is first through a 42 hole, .196" hole-diameter steel die plate ⅜" thick (open area=1.16 in.²), then through a 28 hole, .147" hole-diameter steel die plate .565" thick (open area=0.476 in.²). Final extrusion is through a 72 hole, .070" hole-diameter steel die plate .86" thick (open area=0.324 in.²).

The commercial xerogel employed is commercial 25% high alumina cracking catalyst having a pore volume 0.94 when calcined at 1100° F., and having a packed bulk density of 0.46 when calcined to 1100° F.

EXAMPLE II–1

An extrusion mix is prepared by mixing 2.0 lbs. of xerogel, 3.0 lbs. of precursor slurry (hydrogel) and 0.25 lb. of water. After mixing in an intensive mixer (muller) and repeated extrusion through low resistance dies (large open area) to densify the mix, the mix is extruded through a die plate with holes approximately ¹⁄₁₆-inch in diameter. A portion of the extrudates are oven dried at about 250° F. and calcined for one hour at about 1100° F. (5798–41–2).

EXAMPLE II–2

An extrusion mix is prepared by mixing 2.0 lbs. of xerogel, 3.0 lbs. of precursor gel and 0.05 lb. of water. After mixing in an intensive mixer (muller) and repeated extrusion through low resistance dies (large open area) to compact the mix, the mix is extruded through a die plate with holes approximately ¹⁄₁₆-inch in diameter. A portion of the extrudates are oven dried at about 250° F. and calcined for one hour at about 1100° F. (5798–41–3).

EXAMPLE II–3

An extrusion mix is prepared by mixing 2.0 lbs. of xerogel with 3.0 lbs. of precursor hydrogel. After mixing in an intensive mixer and repeated extrusion through low resistance dies to compact the mix, it is extruded through a die plate with ¹⁄₁₆-inch diameter holes. A portion of the extrudates is oven dried at about 250° F. and calcined for one hour at about 1100° F. (5798–60–1).

TABLE V.—EXAMPLES II–1, II–2 ANDI-

| Mix No. | Extrusion torque | Extrudate crush strength, CS/L (lbs./in.) |
|---|---|---|
| | 20 | 18.1 |
| | 37 | 27.6 |
| | 41 | 32.6 |

In the above examples extrusion is generally poor—characterized by low rate, a tendency for the die to plug and the rate to decrease, and excessive heat generation. The data show the increase in extrudate strength which accompanied extrusion at high solids. However, in each case, crush strength is poor. The solids level is indicated by the torque generated in extruding the mixes.

EXAMPLE II–4

Two samples of the commercial xerogel are milled to fine particle size in high energy jet mills. One sample of milled powder has a weight average diameter of 4.50 microns as measured by a Coulter counter, the second sample has a weight average diameter of 7.0 microns. Extrusion mixes were prepared from the two milled samples and from unmilled xerogel (weight means particle diameter=approximately 74 microns), by mixing with water in an extensive mixer. The mixes are densified by extrusion through a low resistance die and then extruded through a steel plate with holes approximately ⅛-inch in diameter and a steel die plate with holes approximately ¹⁄₁₆-inch in diameter. Portions of the ⅛" and ¹⁄₁₆" diameter extrudates are oven dried at 250° F. and calcined for one hour at 1100° F. Properties of the calcined extrudates and extrusion data are tabulated in Table VI below.

TABLE VI.—EXAMPLE NO. II–4

| Xerogel particle size (microns) | Extrusion mix solids (percent) | ⅛" die | | ¹⁄₁₆" die | |
|---|---|---|---|---|---|
| | | Extrusion torque | Extrudate crush strength, CS/L (lbs./in.) | Extrusion torque | Extrudate crush strength, CS/L (lbs./in.) |
| 74 (a) | 45.5 | 36 | 43 | 45 | 53 |
| 7.0 (b) | 47.5 | 28 | 48 | 27 | 29 |
| 4.5 (c) | 46.7 | 32 | 47 | 35 | 31 |

In the above examples extrusion conditions are not good, although slightly better than for the unmilled xerogels. Extrusion torque is moderately lower for the milled xerogel mixes despite the slightly higher mix solids content, but extrudate strength is not improved by milling the commercial xerogel.

EXAMPLE II–5

Portions of the hydrogel precursor of xerogel used in Examples II 1–4 are oven dried from a solids level of about 8% to 29.1%, 34.7% and 44.6%. During drying the hydrogel is frequently mixed to insure uniform drying. Several extrusion mixes are prepared from these samples of dried hydrogel. The mixes are mixed in an intensive mixer and extruded through low resistance dies to effect densification and compaction. The compacted mixes are then extruded through a die plate with approximately ¹⁄₁₆ inch diameter holes. Portions of the extrudates are oven dried and calcined for one hour at about 1100° F.

Properties of the calcined extrudates and data on the extrusion mixes are listed in Table VII below.

It can also be seen that operation at the higher solids levels is quite satisfactory as indicated by the high extrusion rates, in accord with the invention (5798–99–1, 102–2, 3 and 4).

TABLE VII.—EXAMPLE II-5

| Partially dried hydrogel solids (percent) | Components | | Extrusion mix solids (percent) | Extrusion torque | Extrudate crush strength, CS/L (lbs./in.) |
|---|---|---|---|---|---|
| | Wt. of partially dried hydrogel used (lbs.) | Added to hydrogel in mixer material | | | |
| 29.1 | 4.0 | 1.2 lbs. xerogel | | 45 | 28 |
| 29.1 | 4.0 | 0.9 lbs. xerogel | 38.0 | 26 | 27 |
| 34.7 | 4.0 | 0.05 lbs. water | | 32 | 48 |
| 34.7 | 4.0 | 0.15 lbs. xerogel | 40.3 | 37 | 45 |
| 44.6 | 4.5 | 0.33 lbs. water | | 37 | 32 |
| 44.6 | 4.0 | 0.45 lbs. water and 0.20 lbs. xerogel | 41.0 | 32 | 33 |

In the above mixes, the partially dried hydrogels are modified by the addition of small quantities of water or xerogel in order to obtain an extrudable mix. In none of the cases are good extrusion conditions obtained. Extrudate strength is maximum for the 34.7% hydrogel but is not acceptably high for any of the samples. Thus, this experiment establishes that the partially dried hydrogel produced by conventional methods fails to obtain the objects of this invention. Densification is effected in Examples II–4 and II–5 with the same dies as in Examples II–1, 2, and 3 (5798–44–1, 2 and 3 and 5798–78–1, 2 and 3).

Examples III–1 through xerogels of invention:

EXAMPLE III–1

An extrusion mix is prepared by intensively mixing 20 lbs. of xerogel produced by method number 1 of Example I–2 (double precipitation) with 35 pounds of water. The mix is then compacted by extrusion through a low resistance die (.58″ thick die plate with 42 0.196″ diameter holes). A portion of this compacted mix (4 lbs.) is mixed with additional water (65 gms.) and xerogel (75 gms.) to increase the solids content. Another portion is subjected to additional inventive mixing which also effected an increase in solids due to loss of moisture by evaporation. A portion (4 lbs.) of this mix is mixed with additional water (50 gms.) and xerogel (50 gms.) to further increase the solids content. The above described feed mixes are then extruded through a die plate with approximately $\frac{1}{16}''$ diameter holes. The extrudates are oven dried and calcined for one hour at 1100° F. Data relating to these extrusions are listed in Table VIII below.

EXAMPLE III–2

An extrusion mix is prepared by mixing 1.5 pounds of xerogel produced by method number 2 of Example I–3 with 1.5 pounds of water. After intensive mixing, the mix is compacted by extrusion through low resistance dies. It is then extruded through a die plate with approximately $\frac{1}{16}''$ diameter holes. A portion of the extrudates is oven dried and calcined for one hour at 1100° F. Similar to the preceding experiment, extrusion conditions and extrudate properties listed in Table IX below indicate the improvement in extrusion rate and extrudate strength attributed to the use of xerogel of Example I–3.

TABLE IX.—EXAMPLE III-2

| Mix solids (percent) | Extrusion | | Extrudate | |
|---|---|---|---|---|
| | Torque | Rate (lbs./min.) | Crush strength (lbs./in.) | Pore volume (cc./gm.) |
| 34.3 | 16 | 2.27 | 58 | 1.25 |

Pre-extrusion with first through a $\frac{3}{8}''$ thick die plate with 42 0.196″ diameter holes and through a 0.565″ thick die plate with 27 0.147″ diameter holes (5798–76–1).

EXAMPLE III–3

An extrusion mix is prepared by mixing 16 pounds of xerogel of Example I–3 with 23.3 pounds of water. The mix is intensively mixed and densified as in Example III–2, and then extruded through a die plate with approx-

TABLE VIII.—EXAMPLE III-1

| Description of mix | Mix solids (percent) | Extrusion | | Extrudate | |
|---|---|---|---|---|---|
| | | Torque | Rate (lbs./min.) | CS/L (lbs./in.) | Pore volume (cc./gm.) |
| Original mix | 31.3 | 12 | 1.8 | 57 | 1.20 |
| Original at increased solids | 36.0 | 29 | 1.5 | 96 | 1.08 |
| Original mix plus additional mixing | 38.8 | 32 | 1.9 | 121 | .905 |
| Above mix at increased solids | 40.9 | 50 | 1.9 | 127 | .855 |

Extrusion conditions encountered with the above mixes are entirely satisfactory with rates 2 to 4 times as high as those achieved in Example II. Extrudate strength is satisfactory in all cases, and considerably higher than achieved in Example II despite the fact that extrudate density is low. Low density is indicated by high pore volume of about 1 cc./gm.; pore volume of extrudates prepared in Example II was approximately 0.85 cc./gm. For the extrusion mixes listed above, it can be seen that increased feed solids results in higher extrusion torque, denser extrudates and higher crush strength of extrudates.

imately $\frac{1}{16}''$ diameter holes. A portion of the extrudates is oven dried and calcined for one hour at 1100° F., a second portion is oven dried and calcined for one hour at 1300° F. Data show high extrusion rate, high extrudate strength, and improvement in strength for calcination at a high temperature. See Table X below.

TABLE X.—EXAMPLE III-3

| Mix solids (percent) | Extrusion | | 1,100° F. extrudate | | 1,300° F. extrudate | |
|---|---|---|---|---|---|---|
| | Torque | Rate (lbs./min.) | Crush strength (lbs./in.) | Pore volume (cc./gm.) | Crush strength (lbs./in.) | Pore volume (cc./gm.) |
| 38.3 | 45 | 2.1 | 70 | 0.885 | 93 | 0.87 |

Thus, the above experiment establishes that a higher crush strength is obtained by the higher temperature of calcination of the extrudates of this invention (5798–169–3).

EXAMPLE III-4

An extrusion mix is prepared with 0.50 lb. of xerogel of Example I-3, 1.50 lbs. of standard high alumina cracking catalyst as used in Example II and 2.19 pounds of water. The blend is intensively mixed and then densified by extrusion through low resistance dies as in Examples III-2 and 3. The compacted mix is then extruded through a die plate with approximately $1/16''$ diameter holes. The extrudates are oven dried and calcined at about 1100° F. for one hour. Extrusion data and extrudate properties are listed below in Table XI.

TABLE XI

| Mix solids (percent) | Extrusion | | Extrudate | |
|---|---|---|---|---|
| | Torque | Rate (lbs./min.) | Crush strength (lbs./min.) | Pore volume (cc./gm.) |
| 44.7 | 30 | 1.2 | 55 | 0.915 |

The data show that even when using 25% of the xerogel of invention, extrusion and extrudate strength are improved. The graph of the sole FIGURE I shows the relationship between extrusion torque and extrudate strength for high pore volume xerogel and commercial xerogel. Note position of the blend for Example III-4 (5798-89-3).

Thus, commercial xerogels give improved extrudates when employed with xerogels or partially dried hydrogels of this invention.

EXAMPLE III-5

An extrusion mix is prepared by mixing 400 pounds of xerogel of method I-4 with 710 pounds of water. After intensive mixing the mix is extruded through a die plate with approximately $1/16''$ diameter die holes. See Table XII below.

TABLE XII

| Mix solids (percent) | Extrusion | | Extrudate strength, CSL (lbs./in.) | Extrudate, pore volume (cc./gm.) |
|---|---|---|---|---|
| | Torque | Rate[1] (lbs./min.) | | |
| 33.5 | 28 | 20 | 68 | 1.12 |

[1] The extrusion rate is higher than in preceding examples, because the extruder used in this experiment was larger in size. The larger machine had a 3.5 inch diameter auger as compared to the 2.0 inch diameter auger of the machine used in other examples. Capacity of the larger machine is approximately six times that of the smaller machines.

Thus, extrudates characterizing the objects of this invention are obtained by combining separate methods of this invention, such as combining the inventive methods 1 and 2 as described and illustrated above.

EXAMPLE III-6

An extrusion mix is prepared of 27 parts of xerogel of Example I-3 and 35 parts water. After intensive mixing, a portion of the mix is extruded through a .813" thick die plate with 104 0.063" diameter holes. Another portion of the mix is modified by the addition of ammonium hydroxide to increase the mix pH to 9.0. The high pH mix is extruded through the same die plate as the unmodified mix. In both cases, extrudates are oven dried and calcined for one hour at 1100° F. Extrudates produced from the high pH mix are 1.68 times as strong as extrudates produced from unmodified mix. The high pH mix is slightly lower in solids, due to addition of the ammonium hydroxide, and as a result, extruded at a lower torque. Extrusion rate is, nevertheless, higher.

The above example shows the benefit obtained by high pH in the preparation of the extrusion feed mix, prepared by greater than pH 8.5. Normally, we would have expected the lower extrusion mix solids and extruder torque to produce weaker extrudates (5798-166-167).

EXAMPLE III-7

An extrusion mix is prepared by adding 5.37 parts of cobalt nitrate-water solution (12.2% CoO) and a solution of 3.89 parts of ammonium molybdate in 29.34 parts water to 20 parts of xerogel of Example I-2 (double-precipitation method). After intensive mixing, this material is fed to the extruder and extruded through a die plate containing approximately $1/16''$ diameter orifices. A portion of the extrudates is collected, oven dried at 250° F. and calcined at 1200° F. for one hour. Data on the extrusion operation and on properties of the calcined extrudates is listed in Table XIII below.

TABLE XIII

| Feed Mix solids content (percent) | Extrusion | | Properties of calcined extrudates | | | | | |
|---|---|---|---|---|---|---|---|---|
| | Torque | Rate (lbs./min.) | PV (cc./g.) | CBD (g./cc.) | Diam. (in.) | CS/L (lbs./in.) | MoO3 (percent) | CoO (percent) |
| 40.4 | 20 | 1.93 | .405 | .70 | .0544 | 173 | 15 | 3 |

Extrusion is entirely satisfactory in this example. The data listed above shows that extrusion rate was good and that strength of calcined extrudates was high.

The above example illustrates that the xerogels of this invention are suitable for the preparation of formed catalysts containing metal promotors (5798-86-3).

EXAMPLE III-8

Tablets with a length of approximately $1/4''$ and a diameter of approximately $3/16''$ are formed from commercial 0.9 pore volume high alumina and xerogel of Example I-3. A conventional die and punch is used in the forming operation and the tablets are formed at a pressure of 13,700 p.s.i. Properties of the formed tablets are listed in Table XIV below.

TABLE XIV

| Xerogel type used | Tablet density (g./cc.) | Pellet crush strength (lbs./in.) |
|---|---|---|
| Commercial high alumina | .69 | 39 |
| Example I-3 | .65 | 147 |

The data above demonstrates that the xerogel of the invention may be used to form pellets of unusually high crush strength (5798-123).

EXAMPLE III-9.—THE INVENTION

The hydrogel produced by any one or more of the three methods of this invention is partially dried to a solids content of from about 25% to about 45% and is thereafter extruded, dried, and calcined. The extrudates exhibit the properties of the above disclosed invention.

The crush strength data and extrusion data for Examples III 1-9 inclusive are plotted in the graph of the sole figure. Also, the following data experiments, in addition to the data plotted for the Examples II and III, is plotted in the graphs of the sole figure.

In the sole figure the torque, required for extrusion through a die plate with $1/16$ inch diameter holes, is plotted versus the crush strength of the $1/16$ inch diameter extrudates after calcination for Examples II-1, II-2, II-3, II-4, II-5, III-1, III-2, III-3, III-4, and III-5. Data for other Experiments Nos. 1 through 15 employing commercial xerogel and No. 16 employing method 2 xerogel, are also plotted on the sole figure. These data and the data for the examples listed above are tabulated below in Table XV. In this table each experiment is assigned as identification numbered which is used to identify the experiment in the sole figure.

The figure shows that for any given torque level, which reflects extrusion pressure, crush strength is considerably higher for extrudates prepared from the xerogel of this invention than it is for extrudates prepared from commercial xerogel. Maximum crush strength of extrudates prepared from commercial xerogel is at a moderate level and this is shown to occur only at very high torque levels. At these high torque levels extrusion conditions are poor, characterized by low extrusion rates, excessive heat generation and plugged dies, such that operation is not practical. For the xerogel of the invention, it can be seen that high crush strengths are achieved even at moderate torque levels. Further, extrusion conditions do not deteriorate when operating at high torque levels as they do with commercial xerogels. The data point for Example III-4 show the benefit which is derived from the use of a small quantity of the xerogel of this invention in admixture with a larger quantity of commercial xerogel.

Table XV follows:

TABLE XV

| Type xerogel | Identification No. | Torque | CS/L lbs./in. | Code No. 5798 |
|---|---|---|---|---|
| Commercial | 1 | 25 | 19.8 | 42-1 |
| Do | 2 | 35 | 27.3 | 42-2 |
| Do | 3 | 32 | 25.2 | 43-3 |
| Do | 4 | 22 | 21 | 47-2 |
| Do | 5 | 45 | 41.8 | 47-3 |
| Do | 6 | 38 | 34.7 | 47-4 |
| Do | 7 | 45 | 43.3 | 47-5 |
| Do | 8 | 45 | 30.2 | 51-1 |
| Do | 9 | 44 | 48.1 | 54-3 |
| Do | 10 | 41 | 34.5 | 60-3 |
| Do | 11 | 18 | 31.8 | 75-2 |
| Do | 12 | 10 | 23 | 76-2 |
| Do | 13 | 42 | 41.8 | 76-3 |
| Do | 14 | 50 | 58.6 | 77-2 |
| Do | 15 | 60 | 69.8 | 77-1 |
| Method No. 2 | 16 | 38 | 112 | 75-1 |
| Ex. II-1—Commercial | 17 | 20 | 18.1 | 41-2 |
| Ex. II-2—Commercial | 18 | 37 | 27.6 | 41-3 |
| Ex. II-3—Commercial | 19 | 41 | 32.6 | 60-1 |
| Ex. II-4(a)—Commercial | 20 | 45 | 53 | 151-1 |
| Ex. II-4(b)—Commercial | 21 | 27 | 29 | 151-2 |
| Ex. II-4(c)—Commercial | 22 | 35 | 31 | 151-3 |
| Ex. II-5—Commercial | 23 | 45 | 28 | 44-1 |
| Do | 24 | 26 | 27 | 78-3 |
| Do | 25 | 32 | 48 | 44-3 |
| Do | 26 | 37 | 45 | 78-2 |
| Do | 27 | 37 | 32 | 44-2 |
| Do | 28 | 32 | 33 | 78-1 |
| Ex. III-1—Method No. 2 | 29 | 12 | 57 | 99-1 |
| Do | 30 | 29 | 96 | 102-2 |
| Do | 31 | 32 | 121 | 102-3 |
| Do | 32 | 50 | 127 | 102-4 |
| Ex. III-2—Method No. 2 | 33 | 16 | 58 | 76-1 |
| Ex. III-3—Method No. 2 | 34 | 45 | 93 | 169-3 |
| Ex. III-4—25% method 2+75% Commercial | 35 | 30 | 55 | 89-3 |
| Ex. III-5—Method Nos. 1 and 2 | 36 | 28 | 68 | |

Although the examples and the disclosure are representative of invention, the scope of the invention should not be construed as limited thereby, except as limited in the appended claims. For example, the xerogels of this invention may be employed to make tablets, since the process problems overcome are analagous to those discussed above. The invention includes the use of equivalents, and it is understood that any suitable changes, modifications, and variations may be made without departing from the scope of this invention, as defined in the appended claims.

We claim:

1. In a process for preparing a silica-containing gel characterized in that a xerogel derived therefrom has a pore volume of from about 1.3 to about 2.0 cc./g. when measured after calcining said xerogel, said process comprising:

(1) reacting (a) an alkali metal silicate with (b) mineral acid, (c) in water heel while maintaining a pH of between about pH 1.0 and pH 4.5, and subsequently adding said silicate in an amount sufficient to raise pH to at least about pH 9, and sufficiently to form a gel reaction product, (2) adding to said reaction product a mineral acid in an amount sufficient to lower the pH within a range of at least about pH 7.75 and about pH 8.75, and (3) thereafter aging said reaction product for a period of at least about 15 minutes, at a temperature of at least about 100° F.

2. A hydrogel prepared by the process of claim 1.

3. A xerogel prepared by the process of claim 1, including the step comprising washing and drying said aged product.

4. In a process for extruding a silica-containing gel characterized in that a xerogel derived therefrom has a pore volume of from about 1.3 to about 2.0 cc./g. when measured after calcining said xerogel, said process comprising:

(1) reacting (a) an alkali metal silicate with (b) mineral acid, (c) in a water heel of a pH of between about pH 1.0 and pH 4.5, said silicate and said acid being added in an amount sufficient to raise pH to at least about pH 9, and sufficient to form a gel reaction product, (2) adding to said reaction product a mineral acid in an amount sufficient to lower the pH within a range of at least about pH 7.75 and about pH 8.75, (3) thereafter aging said reaction product for a period of at least about 15 minutes, at a temperature of at least about 100° F., and (4) extruding said aged reaction product.

5. An extrudate formed by the process of claim 4.

6. In a process for preparing a silica-containg tablet characterized in that a xerogel derived therefrom has a pore volume of from about 1.3 to about 2.0 cc./g. when measured after calcining said xerogel said process comprising:

(1) reacting (a) an alkali metal silicate with (b) mineral acid, (c) in a water heel while maintaining a pH of between about pH 1.0 and pH 4.5 and subsequently adding said silicate in an amount sufficient to raise pH to at least about pH 9, and sufficient to form a gel reaction product, (2) adding to said reaction product a mineral acid in an amount sufficient to lower the pH within a range of at least about pH 7.75 and about pH 8.75, (3) thereafter aging said reaction product for a period of at least about 15 minutes, at a temperature of at least about 100° F., and (4) forming said aged reaction product into a tablet.

7. A process according to claim 6, including coating said aged reaction product with aluminum before forming said tablet.

8. In a process for preparing a silica-containing gel characterized in that a xerogel derived therefrom has a pore volume of from about 1.3 up to about 2.0 cc./g. when measured after calcining said xerogel, said process comprising:

(1) reacting (a) an alkali metal silicate with (b) a mineral acid, (c) in a substantially silica-free heel comprising an alkali metal salt of a mineral salt and water of at least about 0.33% of said salt by weight of said water, at the time said reacting initially begins to sufficiently form a reaction product, said salt being present in an amount sufficient to obtain at least a salt:$SiO_2$ molar ratio of 1:72 up to 1:45 after forming said reaction product, and (2) thereafter aging (a) for a period of at least about 15 minutes, (b) at a temperature of at least about 100° F., and (c) at pH of at least about pH 8 to about pH9.

9. A hydrogel produced by the process according to claim 8.

10. A xerogel produced by the process of claim 8, including the step comprising washing and drying said aged reaction product.

11. In a process for extruding a silica-containing gel characterized in that a xerogel derived therefrom has a pore volume of from about 1.3 up to about 2.0 cc./g.

when measured after calcining said xerogel, said process comprising;
(1) reacting (a) an alkali metal silicate with (b) a mineral acid, (c) in a substantially silica-free heel comprising at least about 0.33% of an alkali metal salt of a mineral acid by weight of said water at the time said reacting initially begins to form a reaction product, said salt being present in an amount sufficient to obtain at least a salt:$SiO_2$ molar ratio of 1:72 up to 1:45 after forming said reaction product, and
(2) thereafter aging (a) for a period of at least about 15 minutes, (b) at a temperature of at least about 100° F., and (c) at a pH of at least about pH 8 to about pH 9, and
(3) extruding said aged product.

12. An extrudate prepared by a process according to claim 11.

13. In a process for preparing a silica-containing tablet, characterized in that a xerogel from which the tablet is produced has a pore volume of from about 1.3 up to about 2.0 cc./g. when measured after calcining said xerogel, said process comprising:
(1) reacting (a) an alkali metal silicate with (b) a mineral acid, (c) in a substantially silica-free water-heel comprising an alkali metal salt of a mineral acid and water of at least about 0.33% of said salt by weight of said water at the time said reacting initially begins to sufficiently form a reaction product, said salt being present in an amount sufficient to obtain at least a salt:$SiO_2$ molar ratio of 1:72 up to 1:45 after forming said reaction product, and
(2) thereafter againg (a) for a period of at least about 15 minutes, (b) at a temperature of at least about 100° F., and (c) at a pH of at least about pH 8 to about pH 9, and
(3) forming a tablet from said aged reaction product.

14. In a process for preparing a silica-containing gel characterized in that a xerogel derived therefrom has a pore volume of from about 1.3 up to about 2.0 cc./g. when measured after calcining said xerogel, said process comprising:
(1) reacting (a) an alkali metal silicate with (b) a mineral acid, (c) in a water heel while maintaining a pH of between about pH 1.0 and pH 4.5 and subsequently adding said silicate to said heel, and said silicate being added in an amount sufficient to raise pH to at least about pH 8.0 to about pH 11.0, and sufficient to form a gel reaction product,
(2) subsequently, adding a mineral acid in an amount sufficient to lower pH to a pH of from at least about pH 7.0 to about pH 8.5, and
(3) thereafter aging said reaction product for a period of at least 15 minutes, at a temperature of at least 125° F.,
said subsequent addition of mineral acid and said aging temperature each being sufficiently large to impart properties characterized by said calcine xerogel pore volume.

15. A hydrogel prepared by a process according to claim 14.

16. A xerogel prepared by a process according to claim 14, including the step comprising washing and drying said aged reaction product.

17. A process according to claim 14, including (4) coating said aged reaction product with aluminum.

18. In a process for extruding a silica-containing gel characterized in that a xerogel derived therefrom has a pore volume of from about 1.3 up to about 2.0 cc. per gram when measured after calcining said xerogel, said process comprising:
(1) reacting (a) an alkali metal silicate with (b) a mineral acid, (c) in a water heel while maintaining a pH of between about pH 1.0 and pH 4.5, and subsequently adding said silicate to said heel in an amount sufficient to raise pH to at least about pH 8.0 to about pH 11.0 sufficient to form a hydrogel reaction product,
(2) subsequently adding a mineral acid in an amount sufficient to adjust pH to a pH of from at least about pH 7.0 to about pH 8.5,
(3) thereafter aging said reaction product for a period of at least 15 minutes, at a temperature of at least about 135° F.,
said subsequent addition of mineral acid and said aging temperature, each being sufficiently large to impart properties characterized by said calcine xerogel pore volume, and
(4) extruding said aged reaction product.

19. An extrudate prepared by a process according to claim 18.

20. In a process for preparing a silica-containing tablet, characterized in that a xerogel from which the tablet is produced has a pore volume of from about 1.3 up to about 2.0 cc./g. when measured after calcining said xerogel, said process comprising.
(1) reacting (a) an alkali metal silicate with (b) a mineral acid, (c) in a water heel of a pH of between about pH 1.0 and pH 4.5, said silicate and said acid being added to said heel, and said silicate being added in an amount sufficient to raise pH to at least about pH 8.0 to about pH 11.0, and sufficient to form a hydrogel reaction product,
(2) subsequently adding a mineral acid in an amount sufficient to lower pH to a pH of from at least about pH 7.0 to about pH 8.5,
(3) thereafter aging said reaction product for a period of at least 15 minutes, at a temperature of at least 135° F.,
said subsequent addition of mineral acid and said aging temperature each being sufficiently large to impart properties characterized by said calcine xerogel pore volume, and
(4) forming a tablet from said aged reaction product.

References Cited
UNITED STATES PATENTS

| | | | |
|---|---|---|---|
| 2,478,519 | 8/1949 | Ashley et al. | 252—451 |
| 2,601,235 | 6/1952 | Alexander et al. | 23—182 |
| 2,763,533 | 9/1956 | Ashley et al. | 23—182 |
| 2,839,475 | 6/1958 | Innes | 252—451 |
| 2,933,456 | 4/1960 | Braithwaite | 252—451 |
| 3,004,292 | 10/1961 | Folkins et al. | 252—451 XR |
| 3,243,262 | 3/1966 | Carr et al. | 23—182 |

PATRICK P. GARVIN, *Primary Examiner.*

C. F. DEES, *Assistant Examiner.*